United States Patent [19]

Nudenberg et al.

[11] Patent Number: 4,754,004

[45] Date of Patent: Jun. 28, 1988

[54] PROCESS FOR THE PURIFICATION OF AMORPHOUS ETHYLENE/ALPHAOLEFIN COPOLYMERS

[75] Inventors: Walter Nudenberg, Newtown, Conn.; Edward R. Grandbois, Grafton, Mass.; Jamil A. Khan, Waterbury; Robert A. Yates, Bethany, both of Conn.

[73] Assignee: Uniroyal Chemical Company, Inc., Middlebury, Conn.

[21] Appl. No.: 912,748

[22] Filed: Sep. 26, 1986

Related U.S. Application Data

[63] Continuation-in-part of Ser. No. 777,373, Sep. 18, 1985, abandoned.

[51] Int. Cl.$^4$ .............................. C08F 6/00; C08F 6/24
[52] U.S. Cl. ...................... 526/69; 528/497; 528/498; 528/502
[58] Field of Search ............... 528/498, 502, 497; 526/69

[56] References Cited

U.S. PATENT DOCUMENTS

| | | | |
|---|---|---|---|
| 2,927,103 | 3/1960 | Schneider et al. | 528/498 X |
| 3,018,277 | 1/1962 | Wheelock | 260/93.5 |
| 3,361,007 | 12/1971 | Diliddo | 260/80.78 |
| 3,372,154 | 3/1968 | Turner et al. | 260/94.9 |
| 3,395,136 | 7/1968 | Francis | 260/93.7 |
| 3,431,249 | 3/1969 | Bohrer et al. | 260/93.7 |
| 3,740,381 | 6/1973 | DiDrusco et al. | 528/498 X |
| 3,903,066 | 9/1975 | Rohde | 528/498 X |
| 4,053,697 | 10/1977 | Asada et al. | 526/142 |
| 4,208,530 | 6/1980 | Matsuyama | 528/498 X |
| 4,316,008 | 2/1982 | Willis et al. | 528/498 X |
| 4,319,021 | 3/1982 | Irani et al. | 528/498 |
| 4,436,901 | 3/1984 | Sherk | 528/498 |
| 4,581,431 | 4/1986 | Yamazaki et al. | 528/494 |

FOREIGN PATENT DOCUMENTS

58-210907 12/1983 Japan.

OTHER PUBLICATIONS

"Tables of Physical Properties", vol. 40 (17th ed.) Union Carbide Chem. Co. (1960) p. 2.
"Chemical Eng. Hndbk", J. Perry (ed.) McGraw-Hill Co., Inc., N.Y. (1950) p. 291.

Primary Examiner—Joseph L. Schofer
Assistant Examiner—F. M. Teskin
Attorney, Agent, or Firm—William E. Dickheiser

[57] ABSTRACT

Amorphous ethylene/alphaolefin copolymer (optionally additionally containing nonconjugated polyene) is purified by contacting a reaction mass comprising such polymer and live, soluble polymerization catalyst composition with an effective amount of a liquid wash solution comprising at least one member selected from the group consisting of ethane, propane, butane, isobutane, neopentane, propylene, 1-butene 2-butene and isobutene.

18 Claims, No Drawings

PROCESS FOR THE PURIFICATION OF AMORPHOUS ETHYLENE/ALPHAOLEFIN COPOLYMERS

This application is a continuation-in-part of U.S. patent application Ser. No. 777,373, filed Sept. 18, 1985, now abandoned.

FIELD OF THE INVENTION

This invention relates to a process for the removal of live, soluble catalyst, unreacted monomer and other materials from amorphous ethylene/alphaolefin copolymers and/or from amorphous ethylene/alphaolefin/-nonconjugated polyene terpolymers. In another aspect, this invention relates to a continuous process for the production of amorphous ethylene/alphaolefin copolymer and/or of amorphous ethylene/alphaolefin/nonconjugated polyene terpolymer wherein live soluble catalyst is recycled into the polymerization reactor.

BACKGROUND OF THE INVENTION

A longstanding problem associated with the production of amorphous ethylene/alphaolefin copolymer and amorphous ethylene/alphaolefin/nonconjugated polyene terpolymer is the retention of soluble catalyst residues in the product polymer. (Hereinafter, unless noted otherwise, the term "ethylene/alphaolefin copolymer" when employed in the text and claims of this disclosure shall encompass terpolymers of ethylene, alphaolefins and nonconjugated dienes, as well as copolymers of ethylene and alphaolefins.) The presence of relatively large amounts of such catalyst not only lends an undesirable color to the product polymer but may additionally lead to degradation of such polymer. Moreover, polymer containing too high a residual catalyst content is unsuitable for many uses, including electrical insulation and the like.

An additional problem encountered in the production of amorphous ethylene/alphaolefin/nonconjugated polyene terpolymers is that these materials will generally retain relatively large amounts of polyene monomer. As these nonconjugated polyenes frequently possess an undesirable odor, promote oxidative degradation and interfere with the cure of such polymers, their removal is necessary where the resultant polymer is to be employed in many consumer products.

In the past, the recovery of amorphous ethylene/alphaolefin copolymer from reaction masses comprising soluble polymerization catalysts has involved processes comprising (a) deactivation of the polymerization catalyst by treatment with polar compounds such as water, an alcohol or a ketone and (b) washing the polymer to remove such deactivated catalyst. Thus, for example, U.S. Pat. No. 3,431,249 to Bohrer et al discloses a process for the recovery of ethylene/propylene polymer which is dissolved in a polymerization solvent solution which process involves deactivating the catalyst (with methanol) followed by the precipitation of the dissolved copolymer with an antisolvent which is a saturated or unsaturated $C_3$-$C_4$ hydrocarbon.

However, while processes such as Bohrer et al's will isolate amorphous polymer from reaction media, such processes will not effectively remove soluble catalyst from the polymer so isolated. Thus, Bohrer et al note (at col. 6, lines 4-6) that substantially no difference in physical properties or appearance exists between polymer isolated utilizing their method and polymer isolated by methanol coagulation processes (which processes are undesirable as they require costly solvent clean-up to prevent catalyst poisoning by catalyst deactivator in the recycled solvent). Moreover, U.S. Pat. No. 3,631,007 to B. Diliddo, states (at col. 3, lines 14-23) that, "regardless of the washing technique used", procedures wherein the polymerizer effluent is deactivated and washed at pressures the same or less than the polymerization pressure will produce polymer containing "enough vanadium compound to contribute to discolored and otherwise undesirable product".

To overcome this residual catalyst problem, Diliddo discloses that catalyst deactivation and washing must be accomplished at pressures at least 15 psi higher than polymerization pressures in order to retain ethylene in the polymerizer effluent.

While the Diliddo process does apparently reduce the amount of soluble (vanadium) catalyst in the amorphous product polymer, there are several drawbacks associated with said process. Thus, Diliddo requires that the catalyst be deactivated by treatment with a catalyst poison such as an alcohol or a ketone. Consequently, recyclization of such poisoned catalyst back into the reactor is precluded. In addition, because Diliddo requires that deactivation and washing occur at higher pressures, the polymerization apparatus must be designed with great care lest the catalyst deactivator backflow into the reactor, thereby contaminating such reactor.

Similarly, recently issued U.S. Pat. No. 4,581,431 to Yamazaki et al shows a water extraction process for purifying rubbery ethylene/alphaolefin polymer which first involves adding a "good solvent" to swell the polymer. Yamazaki et al indicate (at col. 4, lines 23-29) that such process is more effective if the catalyst is deactivated prior to adding such "good solvent".

The electron-rich polar materials (e.g., alcohols, ketones, etc.) which are added to deactivate the soluble catalyst will frequently react with components of the catalyst (e.g., halogens, particularly chlorine) to produce acids (e.g., hydrochloric acid). These acids will react with unsaturated unreacted monomers (especially polyenes) thereby forming hydrohalogenated saturated (or partially-saturated) species.

As monomers such as dienes (or other polyenes) are relatively expensive, methods which require deactivation of the catalyst prior to purification and which consequently degrade such expensive monomers are economically disadvantageous. Further, upon heating of ethylene/alphaolefin/nonconjugated polyene polymer to remove moisture and/or residual solvents, such acid may cause crosslinking of the polymers with a resultant decrease in elastomeric properties.

Among the processes developed in the past for the removal of soluble catalyst residue from crystalline homopolymers and copolymers of propylene is that described by Asada et al in U.S. Pat. No. 4,053,697. This process involves polymerizing propylene (optionally with another unsaturated hydrocarbon monomer) in liquid propylene employing an initially insoluble titanium/aluminum catalyst system (although a portion of such catalyst system apparently does become solubilized); withdrawing the polymer slurry so formed from the polymerization zone into the upper part of a counter-current washing zone; and counter-currently contacting the polymer slurry with liquid propylene introduced into a lower part of the washing zone. Asada et al teach that this process will remove both amorphous solvent-soluble polymer and soluble catalyst residues from the crystalline polymer, such soluble catalyst and amorphous polymer being discharged through an overflow line with the propylene. A very similar process is described in Japanese Patent No. 57-92999 to Mitsui Petrochemical Industries K.K.

While such processes are desirable for removing soluble catalyst residues from crystalline polymers, one would assume from a reading of such patents that such processes would be inoperable for removing soluble catalysts from amorphous polymers, as such non-crystalline polymers are removed with—and inferentially not separated from—the soluble catalyst residues in such processes.

Thus, it would be desirable to possess a process for the reduction of soluble catalyst residue in amorphous ethylene/alphaolefin polymers which process permitted the recycling of catalyst and which eliminated the risk of contamination of the polymerization reactor with catalyst deactivators.

Accordingly, it is an object of this invention to provide a process for the removal of soluble catalyst from amorphous ethylene/alphaolefin copolymer wherein the catalyst so removed may be recycled into the polymerization reactor.

It is a further object of this invention to provide a process for the removal of soluble catalyst from amorphous ethylene/alphaolefin copolymer which process eliminates the risk of contamination of the polymerization reactor with a catalyst deactivator.

It is yet another object of this invention to provide a process for washing non-reacted unsaturated monomer from an amorphous ethylene/alphaolefin copolymer polymerization product wherein said unsaturated monomer may be recycled into the polymerization reactor.

The above and additional objects will become more fully apparent from the following description and accompanying Examples.

DESCRIPTION OF THE INVENTION

In one aspect, this invention relates to a process for the purification of amorphous ethylene/alphaolefin copolymer, which process comprises contacting a reaction mass comprising such copolymer and an active soluble polymerization catalyst composition with an effective amount of a liquid wash composition comprising at least one member selected from the group consisting of ethane, propane, butane, isobutane, neopentane, propylene, 1-butene, 2-butene and isobutene.

In one particularly preferred embodiment, this invention relates to a continuous process for the production of amorphous ethylene/alphaolefin copolymer comprising the steps:

(a) introducing into a polymerization reactor (i) monomers; (ii) a soluble polymerization catalyst composition; and (iii) a polymerization reaction medium;

(b) subjecting said polymerization reactor to polymerization conditions, thereby forming a reaction mass comprising amorphous polymer and an active soluble polymerization catalyst composition;

(c) removing said reaction mass from the polymerization reactor;

(d) contacting the reaction mass with an effective amount of a liquid wash composition comprising at least one member selected from the group consisting of ethane, propane, butane, isobutane, neopentane, propylene, 1-butene, 2-butene and isobutene, thereby forming a wash mixture;

(e) isolating the washed polymer from the wash mixture formed in step (d); and (f) recycling at least a portion of the active catalyst composition from the wash mixture into the reactor of step (a).

As is employed in the disclosure and claims herein, the term "ethylene/alphaolefin copolymer" refers to copolymers comprising ethylene, at least one monomer having the formula $H_2C=CHR$ wherein R is $C_1$-$C_{10}$ alkyl, and (optionally) at least one nonconjugated polyene. Such copolymers are amorphous, with no crystallinity being detectable by X-ray diffraction.

Moreover, as employed herein, the term "reaction mass" refers to the effluent of the polymerization reactor. Such effluent may be in the form of a one-phase solution, a two-phase liquid-liquid mixture, a two-phase solid-liquid mixture, or may comprise a mixture of three or more phases. Moreover, where a multi-phase reaction mass is present, it is to be understood that such reaction mass may comprise phases which are partially miscible in each other.

In general, the reaction mass of this invention comprises (1) an active, soluble polymerization catalyst composition; (2) amorphous ethylene/alphaolefin copolymer; (3) reaction medium; and (4) unreacted monomer; as well as (5) (optionally) hydrogen and/or other conventional additives.

The polymerization catalyst composition contained in the reaction mass of the process of this invention may comprise any soluble Ziegler-Natta type catalyst. Ziegler-Natta polymerization catalysts are well known in the art and are coordination catalysts prepared by reacting a metal of Groups 4, 5, 6 or 7 of the Periodic Table of the Elements (as shown on the inside cover of *Handbook of Chemistry and Physics*, CRC Press, 66th Ed., 1985-1986), (e.g., zirconium or vanadium), with an organometallic compound of a Group 2 or 13 element (e.g., aluminum or magnesium). The catalysts which may be employed in the process of this invention are homogeneous catalysts which are soluble in the rection medium, and, therefore, catalysts which are soluble in the reaction mass.

The catalyst compositions of this invention are preferably comprised of a vanadium compound catalyst with an organoaluminum or organomagnesium compound cocatalyst, or of a zirconium compound catalyst with an alumoxane cocatalyst.

Illustrative of the vanadium compounds which are preferably employed as catalysts and which may be removed by the process of this invention include vanadium halides, vanadium oxyhalides, vanadium dithiophosphates, addition complexes of vanadium halides with oxygen- and nitrogen-containing ligands, chelate complexes of vanadium with 1,3-diketone compounds and compounds such as alkyl vanadate esters. Suitable vanadium compounds include, for example, $VCl_4$, $VOCl_3$, vanadium tris(acetylacetonate), vanadium oxybis(acetylacetonate), trimethyl vanadate, triisopropyl vanadate, tetrakis(beta-ethoxyethoxy)vanadium, triallyl vanadate, neopentyl vanadate, tri-n-octadecyl vanadate, tetrahydrofuranate of $VCl_3$, bis(gamma-isopropoxy)-vanadium dibromide, beta-ethoxyethoxyvanadium trichloride, 2,2-dimethyl-1,3-propylenedioxyvanadyl fluoride, fluorovanadyl bis(acetylacetonate), diethoxyvanadyl fluoride, vanadium tris(thenoyl trifluoroacetonate), vanadium tris(trifluoroacetylacetonate), pyridinate of $VCl_3$, trimethylaminate of $VCl_3$, tris(2-ethylhexyl) vanadate, $VI_4$, $VBr_4$, $VOBr_3$, $VOI_3$ and dibromovanadyl acetylacetonate.

The cocatalysts which are employed in such vanadium catalyst compositions and which may be washed from the product polymer by the process of this invention are typically trialkylaluminums, alkylaluminum halides or magnesium compounds. Illustrative of the aluminum compounds typically employed are triethylaluminum, ethylaluminum sesquichloride, ethylaluminum dichloride, diethylaluminum chloride and diisobutylaluminum chloride. Magnesium cocatalysts which are frequently employed include diethyl magnesium, dibutyl magnesium and ethylbutyl magnesium.

The zirconium catalyst compositions which may also be preferably employed in the process of this invention comprise zirconium catalysts, such as $(C_5H_5)_2Zr(CH_3)_2$, $(C_5H_5)_2ZrCl_2$ and the like; in combination with linear or cyclic alumoxane cocatalysts, such as methylalumoxane and the like.

The catalyst composition of this invention may further comprise a promoter, which promoters are well known to those skilled in the art. Such promoters, which are more typically employed in conjunction with vanadium catalysts and aluminum and/or magnesium cocatalysts, are typically halogenated esters or similar compounds which tend to increase the solubility of the catalyst composition in the reaction medium. Representative of the promoters which may be employed are compounds such as those disclosed in U.S. Pat. Nos. 3,301,834, 3,717,613 and 3,629,212.

The amorphous ethylene/alphaolefin copolymers which are purified by this invention may possess a wide range of molecular weights, ranging from 1000 or less to several hundred thousand or more. Such copolymers may further comprise a nonconjugated polyene.

The alphaolefins which may be employed are compounds of the formula $CH_2=CHR$ wherein R is an alkyl radical containing from one to ten carbon atoms. When R contains more than 2 carbon atoms such radical may be straight chain or branched. Commonly employed mono-alphaolefins include propylene, 1-butene, 1-pentene, 1-hexene, 3-methyl-1-pentene, 1-heptene, 1-octene and 1-decene. In one preferred embodiment, the ethylene/alphaolefin polymers further comprise alkyl- and/or aryl- substituted norbornene.

The polyenes which may be employed in the process of this invention are nonconjugated. Illustrative of such nonconjugated polyenes are aliphatic dienes such as 1,4-hexadiene, 2-methyl-1,4-pentadiene, 3-methyl-1,4-hexadiene, 4-methyl-1,4-hexadiene, 1,8-decadiene, exo- and endo-dicyclopentadiene and the like; exo- and endoalkenylnorbornenes, such as 5-propenyl-, 5-(buten-2-yl)-, and 5-(2-methylbuten-2'-yl)norbornene and the like; alkylalkenylnorbornenes, such as 5-methyl-6-propenylnorbornene and the like; alkylidenenorbornenes, such as 5-methylene-, 5-ethylidene-, and 5-isopropylidene-2-norbornene, vinylnorbornene, cyclohexenylnorbornene and the like; alkylnorbornadienes, such as methyl-, ethyl-, and propylnorbornadiene and the like; and cyclodienes such as 1,5-cyclooctadiene, 1,4-cyclooctadiene and the like.

The reaction medium employed in the practice of this invention is comprised of a liquid alphaolefin, a $C_3$–$C_{10}$ alkane or mixtures thereof. It is to be understood that such reaction medium may additionally contain a minor amount of other nonreactive hydrocarbons such as benzene, toluene and the like. In general, it is preferred that the reaction medium comprise the same liquid employed as the wash solution, thereby permitting recycling of the wash solution into the reactor, after the washed polymer has been removed from said solution.

Preferably, the reaction medium of the reaction mass of this invention is comprised of (i) from about 15 to 100 weight percent of an alphaolefin of the formula $CH_2=CHR$ wherein R is $C_1$–$C_{10}$ alkyl and (ii) from 0 to about 85 weight percent of an aliphatic $C_3$–$C_{10}$ hydrocarbon which is inert to the polymerization reaction. Illustrative of the aliphatic compounds which may be employed are alkanes such as butane, isobutane, pentane, hexane, heptane, 2-ethylhexane and the like; cycloalkanes such as cyclopentane and the like; alkenes such as 2-pentene and the like; and cycloalkenes such as cyclohexene and the like.

In many instances of ethylene/alphaolefin polymerization, hydrogen gas is an added reactant in the polymerization reaction and thus may be present in the reaction mass. Hydrogen gas is employed to improve the regulation of the molecular weight of the polymer produced in the reaction. Specifically, lower molecular weights are obtainable when hydrogen gas is utilized.

In addition, the reaction mass may optionally additionally contain other materials which are known in the art, such as Lewis bases, e.g., nitrogen-containing acid scavengers (e.g. pyridine) and the like.

The liquid wash composition employed in the process of this invention comprises at least one member selected from the group consisting of ethane, propane, butane, isobutane, neopentane, propylene, 1-butene, 2-butene and isobutene. Preferably, such wash composition comprises propylene or 1-butene. Most preferably, such composition comprises propylene.

The process of this invention is typically performed as follows. The monomers, reaction medium and catalyst composition are introduced into the polymerization reactor. The catalyst composition may be preformed, or may be formed in situ by addition of the appropriate ingredients to the reactor. These reactants are subjected to polymerization conditions, thereby forming a reaction mass which contains both amorphous ethylene/alphaolefin polymer and a soluble, active catalyst composition. Such reaction mass may additionally contain unreacted monomers, dissolved hydrogen and other conventional additives.

Preferably, the reaction mass is then agitated thereby increasing the surface area of the polymer therein. Such agitation may take place either before or during washing. This increasing of the surface area, while not required for the process of this invention, aids the wash solution in removing catalyst entrapped within the polymer. This agitation may be accomplished by any suitable means, which means are well known to those skilled in the art.

The reaction mass in contacted with an effective amount of a liquid wash composition comprising at least one member selected from the group consisting of ethane, propane, butane, isobutane, neopentane, propylene, 1-butene, 2-butene and isobutene. It is important that such washing be conducted at conditions (typically at increased pressure) wherein the wash composition is substantially entirely in the liquid phase. It is to be noted that it is not critical whether such washing is conducted at pressures above or below that of the polymerization phase, so long as the wash composition is in liquid form.

Such washing may be accomplished by any effective means which will permit sufficient contact between the wash solution and the polymer to be washed. Illustrative of means which may be employed are mixer-settlers; centrifugal extractors; gravity-operated extractors such as wetted-wall towers, spray towers, baffle towers, packed towers, perforated plate (sieve plate) towers, towers agitated with rotating stirrers, pulsed towers wherein the liquid contents are hydraulically pulsed, pulsed towers having reciprocating plates and the like.

An amount of wash composition sufficient to remove live catalyst entrapped within the polymer is employed. This amount will vary in accordance with parameters such as the concentration of the catalyst, the molecular weight of the polymer, the temperature at which the wash is preformed, and the like. However, one skilled in the art may easily determine by routine experimentation the optimum amount of wash to be employed for any given reaction mass.

Ethylene/alphaolefin polymer washed in accordance with the process of this invention will be of greatly increased purity as the purification process of this invention will generally be effective to remove impurities (such as unreacted monomer and the like) which may otherwise be entrapped within the polymer. Moreover, such purification is accomplished without the concurrent production of acids. This latter result is particularly important in the making of ethylene/alphaolefin/non-conjugated polyene terpolymers, as the polyene monomers—which are relatively expensive components—are not degraded and thus may be recirculated into the polymerization reactor. Polymers purified in accordance with this invention are well suited for electrical and other similar uses requiring low residual metal content.

Because the catalyst is not deactivated in the process of this invention, such catalyst may be recycled. Moreover, because no catalyst poisons, such as alcohol, water or ketones, are introduced into the reactor system, the danger of such substances poisoning the polymerization reactor is substantially eliminated.

EXAMPLES

The following Examples are intended to further illustrate the invention and are not intended to limit the scope of the invention in any manner.

EXAMPLE 1

A reaction mass containing 21.8 weight percent of ethylene/propylene copolymer in hexane was produced. Such copolymer possessed a molecular weight of 3800; an iodine number of less than 0.2; and comprised 64 weight percent propylene.

Several samples of the reaction mass were withdrawn from the polymerization reactor into nitrogen sparged containers. These samples were sealed to exclude exposure to air and moisture. Based on the catalyst level used for making such copolymer, in the absence of catalyst precipitation or deactivation the copolymer contained 4350 parts per million (by weight) of aluminum and 256 parts per million of vanadium.

One hundred and fifty grams of a high solids (36.3%) portion of such sample was partially flocced with 600 grams of liquid propylene to yield a two-phase solution wherein the lower phase (Sample A) comprised the ethylene/propylene copolymer. This Sample was analyzed for its aluminum and vanadium content. The results of such analysis is summarized in Table I below.

TABLE I

| Sample | Aluminum (ppm) | Vanadium (ppm) |
|---|---|---|
| Untreated polymer* | 4350 | 256 |
| A | 1700 | 180 |

*calculated values.

Sample A was redissolved in hexane to give 100 grams of a solution of 30% copolymer in hexane. This solution was washed with 400 grams of liquid propylene by adding such propylene and vigorously stirring for 2 minutes.

This washing produced a lower precipitated ethylene/propylene copolymer layer (Sample B) and a supernatent layer (Sample C) comprising dissolved copolymer. After being dried, samples of copolymer of each layer were analyzed for their aluminum and vanadium contents. As a further control, a sample (Sample D) of the untreated copolymer from which hexane was evaporated (leaving some catalyst adhered to the reactor walls) was similarly analyzed. The results of such analyses are summarized in Table II below:

TABLE II

| Sample | Description | Aluminum (ppm) | Vanadium (ppm) |
|---|---|---|---|
| — | Untreated polymer* | 4350 | 256 |
| D | hexane-evaporated control | 3100 | 200 |
| B | washed copolymer | 610 | 110 |
| C | wash solution | 4700 | 280 |

*calculated values.

The above data indicates that the final washed copolymer (Sample B) contains greatly reduced amounts of aluminum and vanadium, relative to either the calculated or the evaporated hexane (Sample D) control. Moreover, such results indicate that the final wash solution (Sample C) contains greatly increased amounts of catalyst. Because this catalyst is not deactivated, it may (along with the remainder of the wash solution which contains no catalyst poison) be recycled back into the polymerization reactor.

EXAMPLE 2

A two-hundred gram sample of ethylene/propylene copolymer in hexane (27% solids) (which copolymer was produced in the reaction disclosed in Example 1) was mixed with 750 grams of liquid propylene and agitated for about 3 minutes. Such treatment yielded a dispersion of droplets which settled to the bottom of the reactor and agglomerated when agitation was stopped. After drying, the copolymer present in the bottom layer (Sample E) and in the supernatent layer (Sample F) were analyzed for their aluminum and vanadium contents. The supernatent layer was again agitated with 400 grams of liquid propylene, thereby forming a second bottom layer of copolymer (Sample G). This "twice-washed" layer was similarly analyzed. The results of such analyses are summarized in Table III.

TABLE III

| Sample | Description | Aluminum (ppm) | Vanadium (ppm) |
|---|---|---|---|
| — | Unwashed polymer* | 4350 | 256 |
| E | Bottom layer (copolymer) | 990 | 70 |
| F | Supernatent propylene layer | 4200 | 560 |
| G | Twice washed | 910 | 56 |

TABLE III-continued

| Sample | Description | Aluminum (ppm) | Vanadium (ppm) |
|--------|-------------|----------------|----------------|
|        | copolymer in Sample F |  |  |

*calculated values.

It is seen that washing with a liquid propylene wash solution considerably reduces the aluminum and vanadium contents in the copolymers studied. Exclusion of air and moisture during the washing process prevents formation of insoluble non-extractable metal oxides. In the same fashion that reworking of the supernatent (Sample F) gave product with reduced catalyst residues, it is apparent that multiple cycle washes of first wash copolymer layer (Sample E) would yield further reduced levels of catalyst residues.

EXAMPLE 3

A reaction mass comprising ethylene/propylene/dicyclopentadiene terpolymer, vanadium oxytrichloride catalyst and ethyl aluminum sesquichloride cocatalyst was transferred directly from the reactor into a vessel filled with liquid propylene. The aluminum and vanadium contents of such terpolymer was measured after such washing. It was found that the aluminum content was reduced by 75 percent and the vanadium content was reduced by 72 percent, based upon the calculated content of the prewashed polymer.

What is claimed is:

1. A process for the purification of amorphous ethylene/alphaolefin copolymer, said process comprising contacting a reaction mass comprising such copolymer, a reaction medium and an active polymerization catalyst composition which is soluble in said reaction medium with an amount effective to remove live catalyst entrapped within the copolymer of a liquid wash composition not containing a catalyst poison and comprising at least one member selected from the group consisting of ethane, propane, butane, isobutane, neopentane, propylene, 1-butene, 2-butene and isobutene.

2. The process of claim 1 wherein the ethylene/alphaolefin copolymer additionally comprises a nonconjugated polyene.

3. The process of claim 1 wherein the active polymerization catalyst composition comprises a vanadium compound catalyst and an aluminum compound cocatalyst.

4. The process of claim 1 wherein the active polymerization catalyst composition comprises a zirconium compound catalyst.

5. The process of claim 1 wherein said reaction mass comprises a reaction medium comprised of (i) from about 15 to 100 weight percent of an alphaolefin of the formula $CH_2=CHR$ wherein R is $C_1-C_{10}$ alkyl and (ii) from 0 to about 85 weight percent of an aliphatic $C_3-C_{10}$ hydrocarbon which is inert to the polymerization reaction.

6. The process of claim 5 wherein component (i) of the reaction medium is propylene.

7. The process of claim 6 wherein component (ii) is a $C_5-C_{10}$ alkane.

8. The process of claim 1 wherein said liquid wash composition comprises propylene or 1-butene.

9. A continuous process for the production of amorphous ethylene/alphaolefin copolymer comprising the steps:
   (a) introducing into a polymerization reactor
      (i) ethylene and at least one other alpha-olefinic monomer;
      (ii) an active polymerization catalyst composition which is soluble in the polymerization reaction medium; and
      (iii) a polymerization reaction medium;
   (b) subjecting said polymerization reactor to polymerization conditions, thereby forming a reaction mass comprising amorphous polymer and an active, soluble polymerization catalyst composition;
   (c) removing said reaction mass from the polymerization reactor;
   (d) contacting said reaction mass with an amount effective to remove live catalyst entrapped within the copolymer of a liquid wash composition not containing a catalyst poison and comprising at least one member selected from the group consisting of ethane, propane, butane, isobutane, neopentane, propylene, 1-butene, isobutene and 2-butene;
   (e) isolating the washed polymer from the wash solution/reaction slurry mixture of step (d); and
   (f) recycling at least a portion of the live catalyst washed from the ethylene/alphaolefin copolymer into the polymerization reactor employed in step (a).

10. The process of claim 9 wherein said reaction mass is agitated after being removed from the polymerization reactor in step (c) and before contacting said mass with a liquid wash solution in step (d).

11. The process of claim 9 wherein said reaction mass is agitated after being removed from the polymerization reactor in step (c) while contacting said mass with a liquid wash solution in step (d).

12. The process of claim 9 wherein the ethylene/alphaolefin copolymer additionally comprises a nonconjugated polyene.

13. The process of claim 9 wherein the active polymerization catalyst composition comprises a vanadium compound catalyst and an aluminum compound cocatalyst.

14. The process of claim 9 wherein the active polymerization catalyst composition comprises a zirconium compound catalyst.

15. The process of claim 9 wherein the polymerization reaction medium is comprised of (i) from about 15 to 100 weight percent of an alphaolefin of the formula $CH_2=CHR$ wherein R is $C_1-C_{10}$ alkyl and (ii) from 0 to about 85 weight percent of an aliphatic $C_3-C_{10}$ hydrocarbon which is inert to the polymerization reaction.

16. The process of claim 15 wherein component (i) of the reaction medium is propylene.

17. The process of claim 16 wherein component (ii) is a $C_5-C_{10}$ alkane.

18. The process of claim 9 wherein said liquid wash composition comprises propylene or 1-butene.

* * * * *